(12) United States Patent
Kraus et al.

(10) Patent No.: US 7,370,462 B2
(45) Date of Patent: May 13, 2008

(54) STEAM INJECTION TUBES INDIVIDUALLY MOUNTED FOR SELECTIVE REMOVAL FROM MANIFOLD

(75) Inventors: Timothy James Kraus, Hedrick, IA (US); Randal Alan Cufr, Oskaloosa, IA (US); Daniel James Meyer, Ottumwa, IA (US)

(73) Assignee: Deere & Company, Moline, IL (US)

( * ) Notice: Subject to any disclaimer, the term of this patent is extended or adjusted under 35 U.S.C. 154(b) by 422 days.

(21) Appl. No.: 11/153,702

(22) Filed: Jun. 15, 2005

(65) Prior Publication Data

US 2006/0283163 A1 Dec. 21, 2006

(51) Int. Cl.
*A01D 39/00* (2006.01)
*A01D 43/02* (2006.01)
*A01D 75/00* (2006.01)

(52) U.S. Cl. ............................ 56/341; 56/364; 56/16.8; 56/16.4 R; 100/74

(58) Field of Classification Search ................ 122/510, 122/511; 56/341, 364, 16.4 R, 16.8; 285/124.1, 285/205; 100/73
See application file for complete search history.

(56) References Cited

U.S. PATENT DOCUMENTS

| | | | |
|---|---|---|---|
| 666,127 A * | 1/1901 | Borrowman et al. ........ 122/511 |
| 4,550,556 A * | 11/1985 | Meiners ........................ 56/341 |
| 5,593,279 A * | 1/1997 | Hayashi ...................... 285/205 |
| 5,758,479 A * | 6/1998 | Staheli .................... 56/16.4 R |
| 5,829,794 A * | 11/1998 | Schulz-Hausmann et al. .......................... 285/205 |
| 5,918,912 A * | 7/1999 | Keifel et al. ............. 285/124.1 |
| 6,233,840 B1 * | 5/2001 | Finney .................... 56/16.4 R |
| 6,896,298 B2 * | 5/2005 | Walterscheid et al. ...... 285/205 |
| 6,925,793 B2 * | 8/2005 | Schlesser et al. ............. 56/341 |
| 6,948,300 B1 * | 9/2005 | Bandstra et al. ............. 56/341 |
| 7,194,851 B2 * | 3/2007 | Kraus et al. .................. 56/341 |
| 2006/0131874 A1 * | 6/2006 | Frank et al. ................ 285/205 |
| 2006/0283167 A1 * | 12/2006 | Kraus et al. .................. 56/341 |

* cited by examiner

*Primary Examiner*—Kenneth Bomberg
*Assistant Examiner*—Andrew M Juettner

(57) ABSTRACT

A steam injection manifold assembly is mounted to a crop pick-up assembly and is provided with an elongate manifold disposed lengthwise of the pick-up assembly. A plurality of steam injection tubes are releasably mounted to the manifold to receive steam exiting through respective steam outlet openings provided in the manifold. In one embodiment the injection tubes are shaped similarly to tine stripper bands of the pick-up, and in another embodiment the injection tubes define the stripper bands of the pick-up.

3 Claims, 5 Drawing Sheets

STEAM INJECTION TUBES INDIVIDUALLY MOUNTED FOR SELECTIVE REMOVAL FROM MANIFOLD

FIELD OF THE INVENTION

The present invention relates to crop re-hydrations systems used in conjunction with large square balers and, more particularly, relates to a steam injection arrangement associated with the pick-up reel of the baler.

BACKGROUND OF THE INVENTION

It is known to use steam injection manifolds in combination with large square balers for directing steam into top and bottom sides of a windrow being picked up by the baler pick-up for being baled by the baler. Heretofore these steam injection manifolds have been constructed as a weldment which has one or more of the drawbacks of:

1) being too costly,
2) not allowing the injection tubes to be easily individually replaced if damaged,
3) requiring the entire injection manifold to be removed in order to permit replacement of damaged pick-up strippers, and
4) not having sufficient tolerance to accommodate variations in pick-up strippers.

The problem to be solved by the invention is the provision of a steam injection arrangement which overcomes the above-noted drawbacks of the prior art.

SUMMARY OF THE INVENTION

According to the present invention, there is provided an improved steam injection arrangement for treating crop as it is being lifted into a baler by the baler pick-up.

An object of the invention is to provide an economical steam injection arrangement including injection tubes which can be easily individually replaced.

The above object is achieved by a steam injection arrangement of a first embodiment, wherein the individual injection tubes are mounted so as to be releasable from the injection manifold, and of a second embodiment wherein the individual injection tubes serve also as the crop strippers for the pick-up of the baler.

DESCRIPTION OF THE PREFERRED EMBODIMENT

Figure 1:
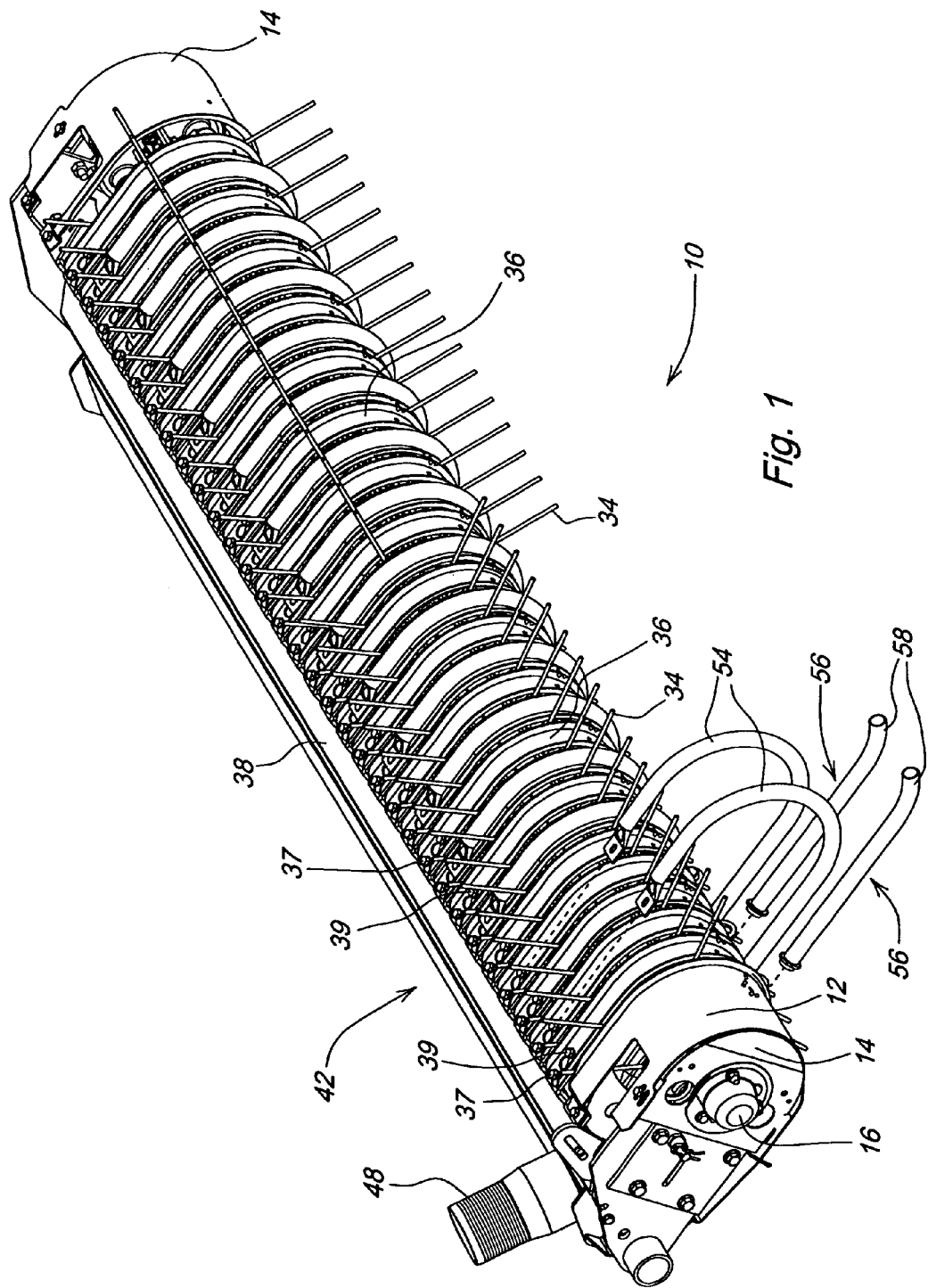
FIG. 1 is a right front perspective view of a crop pick-up together with a steam injection manifold to which removable steam injection tubes are coupled, with representative ones of the steam injector tubes being shown in exploded view.
Figure 2:
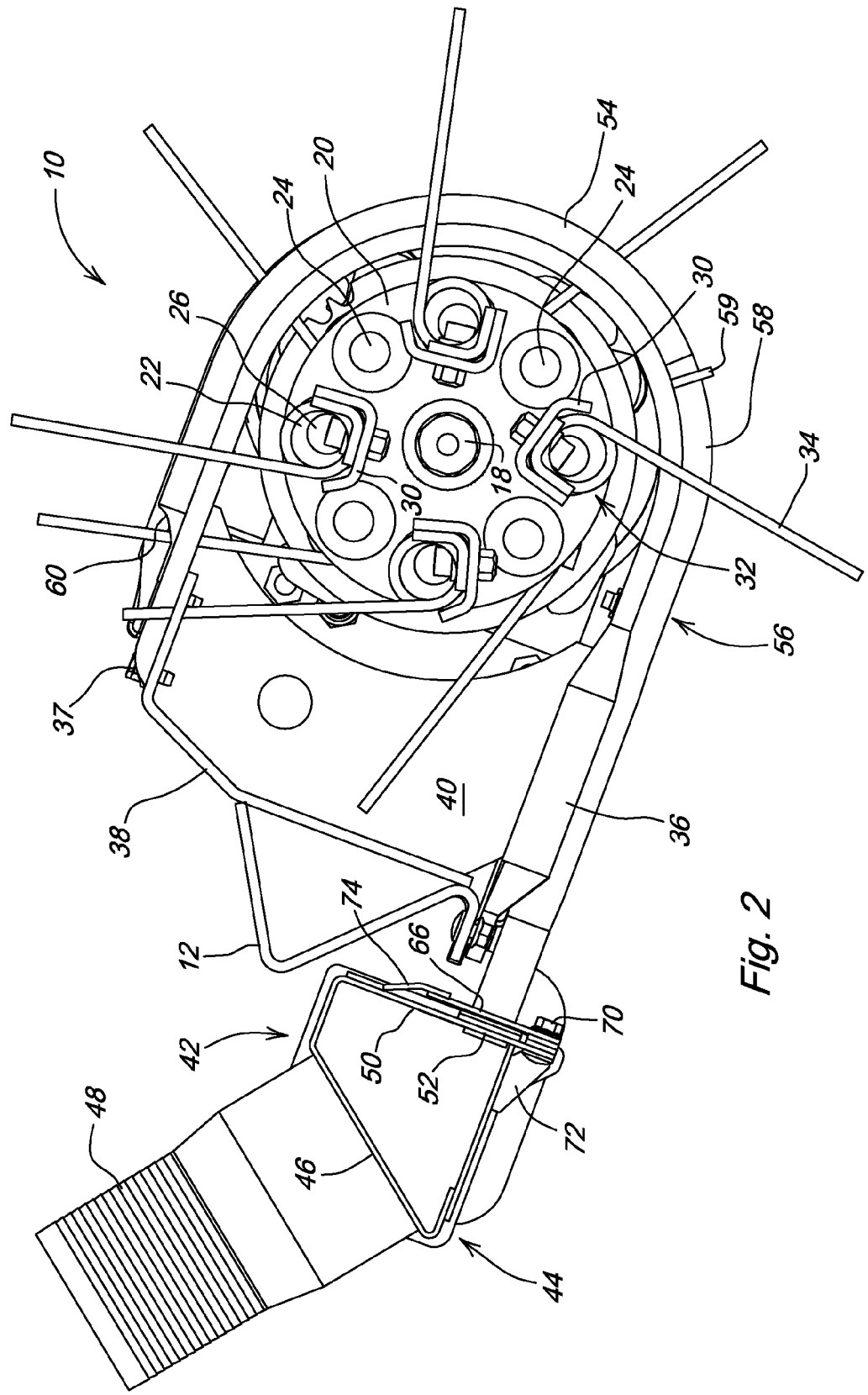
FIG. 2 is a right end view of the pick-up shown in FIG. 1, but with the right end support for the tine reel being removed.

Referring now to FIGS. 1 and 2, there is shown a crop pick-up 10 comprising a frame 12 including opposite side members 14 containing bearing assemblies 16 supporting opposite ends of a reel center shaft 18 having a tooth-bar support disc 20 mounted to location half-way between opposite ends. Located on opposite sides of the disc 20 are eight cylindrical tooth-bar receptacles 22, with the receptacles on the opposite sides of the disc 20 being aligned with each other and through bores in the disc 20. Alternate receptacles 22 on the left-hand side of the disc 20 receive a left-hand set of four tooth bars 24, while alternate receptacles 22 on the right-hand side of the disc receive a right-hand set of four tooth bars. The opposite ends of the tooth bars 26 are supported, in a known manner, by a cam support arrangement (not shown). Extending along, and fixed to, each tooth bar 24 and 26 is an angle member 30. A plurality of pick-up tine arrangements 32 are spaced along each angle member 30, with each tine arrangement including a pair of tines 34 respectively joined to opposite ends of a central coil spring section, as is known in the art. The tines 34 are mounted in co-planar arrangements on the four angle members 30 so that two sets of four co-planar tines 34 result for each coplanar set of four tine arrangements 32. The pick-up 10 includes a plurality of crop stripper bands 36 disposed between adjacent sets of co-planar tines 34, with each stripper band including an upper rear end provided with a rearwardly opening slot receiving a headed fastener 37 screwed into an upper forward section of a support member 38 extending transversely between the opposite side members 14. In addition to the fastener 37, each stripper band 36 is secured in place by a further headed fastener 39 located within a narrow section of a keyhole-shaped opening provided in the stripper band at a location spaced ahead of the rearwardly opening slot that receives the fastener 37. The stripper bands 36 each include an upper, horizontal rear section that extends forwardly from the support member 38 and is joined to a middle section that is curved at a radius about the tined reel center shaft 18 and joined to a lower, horizontal rear section having a rear end fastened to a lower horizontal support member 40 extending transversely between the side members 14.

The cam support arrangements act to effect rocking of the tooth bars 26 as the center shaft 18 rotates so as to cause the pick-up tines 32 to undergo movement placing them in positions conducive for picking up a windrow of crop as the tines 34 sweep counterclockwise (FIG. 2) into the windrow at about the seven o'clock position and to carry the crop rearwardly and then withdraw from the crop at about the ten o'clock position, with the stripper bands 36 aiding in disengaging the crop from the teeth 34 as the teeth move below the level of the upper horizontal sections of the stripper bands 36.

A steam injection arrangement 42 is provided in conjunction with the pick-up 10 and includes a horizontal, tubular, steam injection manifold 44 extending transversely between the side members 14 at a lower rear location of the pick-up 10. The manifold 44 is generally trapezoidal in cross section and includes a rear wall 46 that slopes downwardly to the rear. A steam distribution tube 48 is coupled to an inlet opening is provided in a right hand region of the wall 46 for supplying steam to the manifold 44. The manifold 44 has an upright front wall 50 provided with a plurality of steam outlet openings 52 spaced horizontally along a lower region of the wall 50 so as to be co-planar with the stripper bands 36, with it being noted that the outlet openings 52 are located at a level slightly below that of the lower horizontal sections of the stripper bands 36.

A plurality of steam injection tubes 54 are coupled to alternate ones of the outlet openings 52, while a plurality of steam injection tubes 56 (only two shown in FIG. 1) are coupled to those outlet openings not occupied by the tubes 54. The injection tubes 54 are shaped similar to the stripper bands 36, while each of the injection tubes 56 is straight over a majority of its length but terminates in an upwardly curved front end section 58.

With reference to FIG. 2, it can be seen that the injection tubes 54 each include an upper horizontal section having a rear end defining a rearwardly directed steam discharge orifice 60 and a tab coupled to the cross support 38 by the headed fastener 39, and have a lower horizontal section that fits tight against the underside of the lower horizontal section of an associated one of the stripper bands 36. The injection tubes 56 likewise fit tight against the underside of the lower horizontal portions of the associated stripper bands 36 and are each coupled to the associated stripper band by an U-bolt 59 engaged with the forward end 58 of the injection tube 56.

Figure 3:
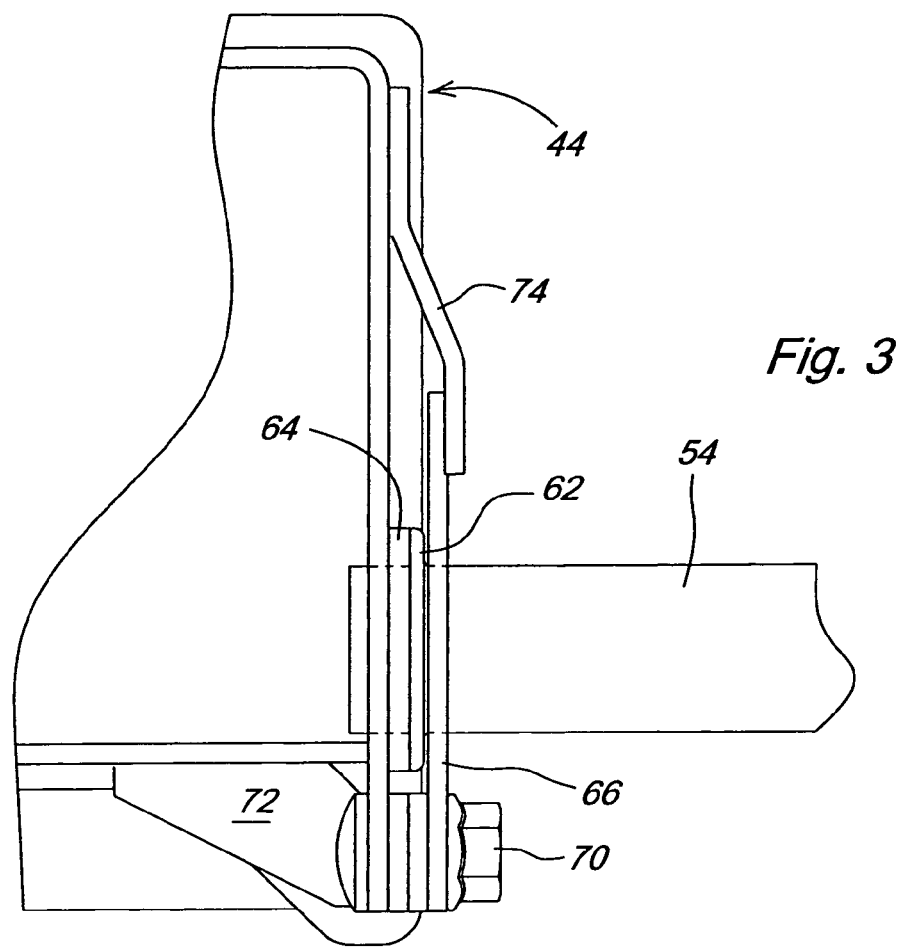
FIG. 3 shows the connection between the steam injection tube and manifold.
Figure 4:
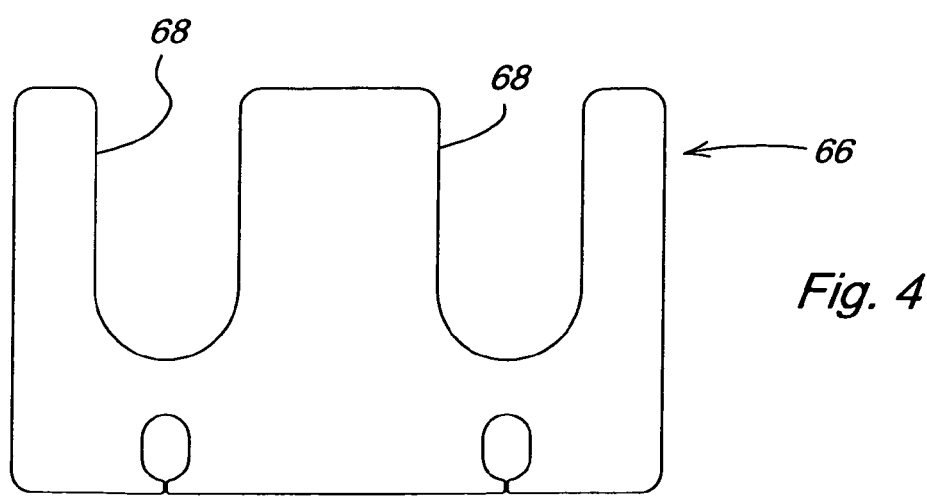
FIG. 4 is a front view of one of the connection clips shown in FIG. 3.

Referring now also to FIG. 3, it can be seen that the rear portion of the lower horizontal section of the injection tube 54 includes an annular shoulder 62 that bears against a resilient washer 64 that serves as a seal for preventing steam from escaping through any gap that might exist between the tube 54 and the associated outlet opening 52. It is here noted that each of the injection tubes 56 is also provided with a shoulder 62 and washer 64, with adjacent ones of the tubes 54 and 56 being held in place by a clip 66 that is provided with upwardly opening, U-shaped slots 68 sized so that they fit over the tubes 54 and 56 and engage the opposite sides of the shoulders 62 from the washers 64 so that the washers are pushed tightly against the upright forward wall 50 of the steam injection manifold 44 when threaded fasteners 70 are placed into holes provided in a lower portion of the clip 66 and tightened into threaded holes provided in a support member 72 fixed to, and extending lengthwise of a bottom surface of the manifold 44. Providing further support for the clip 66 is a lip member 74 that extends lengthwise of, and is fixed to, an upper region of the rear wall 50 of the injection manifold 44, the lip member 74 being shaped so that a lower edge portion 74 is disposed in spaced parallel relationship to the manifold front wall and contacts an upper rear surface portion of the clip 66. It is here noted that individual clips could be provided for the retaining tubes 54 and 56 mounted to the steam injection manifold 54, or that the clips 66 could be made wider and provided with additional slots 68 for receiving additional tubes 54 and/or 56. However, increasing the number of tubes held by a given clip might not be desirable from a manufacturing tolerance standpoint nor from a standpoint of the ease of being able to replace damaged tubes.

Thus, it will be appreciated that replacement of a damaged tube 54 can be easily achieved by merely removing the associated bolt 70 and clip 66, and then pulling forwardly on the tube 54 so as to withdrawn it from the associated manifold outlet opening 52. A damaged tube 56 may be replaced in a similar manner, but with the associated U-bolt 59 being removed for permitting forward movement of the tube 56 once the clip 66 is removed. Installation of a replacement tube 54 or 56 is done in the reverse order. The procedure mentioned above for removing a tube 54 or a tube 56 would also be followed in order to gain access for replacing a damaged stripper band 36.

Figure 5:
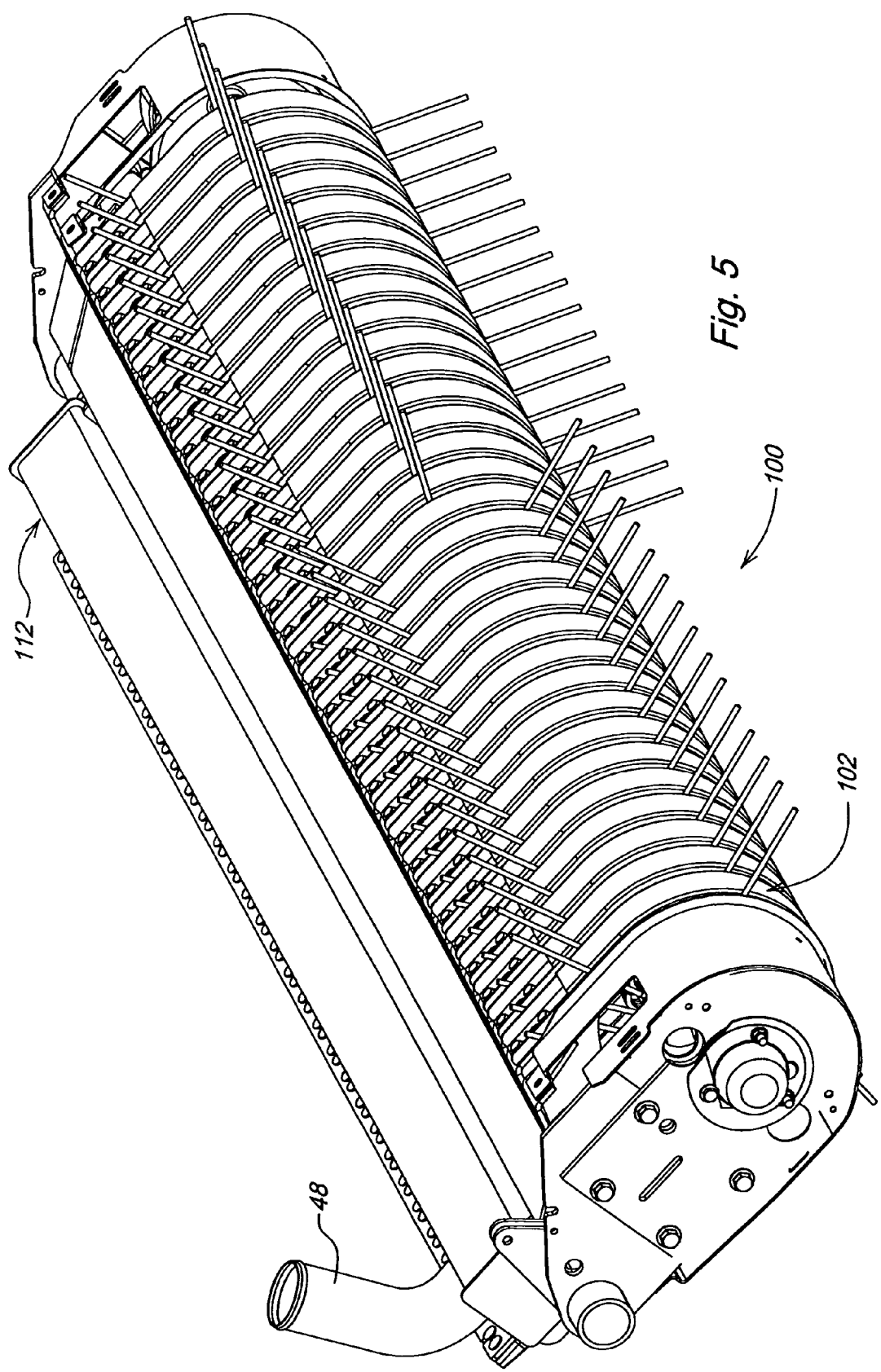
FIG. 5 is a right front perspective view of a crop pick-up equipped with crop strippers that also serve as steam injection tubes.
Figure 6:
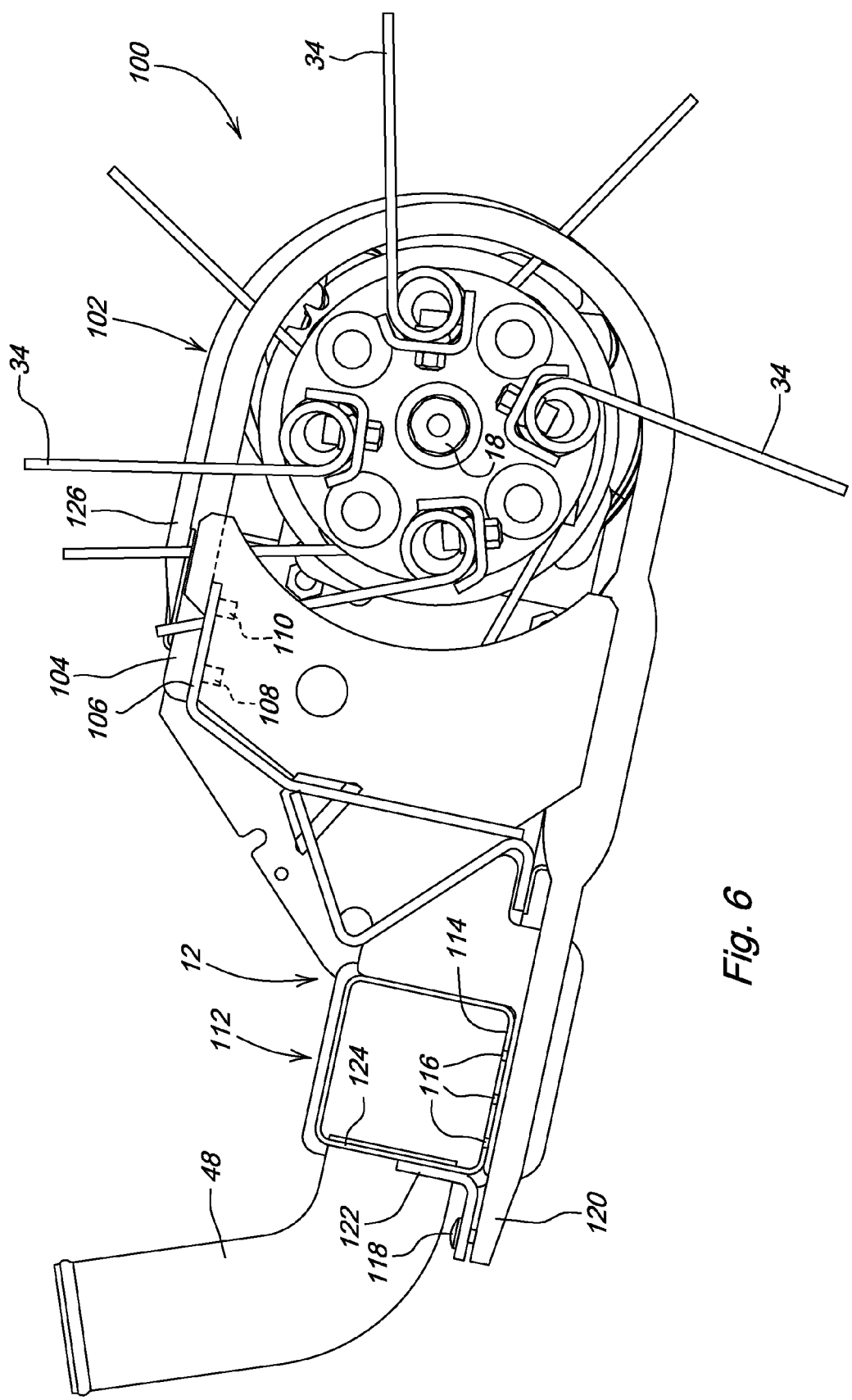
FIG. 6 is a right end view of the pick-up shown in FIG. 5, but with the right end support for the tine reel being removed.

Referring now to FIGS. 5 and 6, there is shown an alternate embodiment wherein the tine strippers also serve as steam injection tubes. Specifically, there is shown a pick-up 100, which in most respects is like the previously described pick-up 10, with only the new parts being described in detail. Thus arranged between transversely spaced rows of the coplanar tines 34 are tubular tine stripper bands 102, which also serve as steam injection tubes. The tine stripper bands 102 each have an upper horizontal section including a rear mounting portion 104 defined by an extension of three adjacent walls of the stripper which overlie, a horizontal portion of a transverse support member 106. A first headed fastener 108 is received in a rearwardly opening slot provided in the rear mounting portion 104 and tightened into a threaded opening provided in the support member 106, and a second headed fastener 110 is received in a keyhole-shaped opening provided in the end portion 104 at a location spaced forwardly of the slot, with the fastener 110 also being tightened into a threaded hole provided in the support member 106. The forward end of the upper horizontal section of each stripper band 102 is joined to a forward middle section formed at a radius about the reel center shaft 18 and joined to a lower horizontal section projecting rearwardly beneath an injection steam manifold 112 mounted to a lower rear location of the pick-up frame 12. The steam manifold 112 has a square cross section with a bottom wall 114 containing a plurality of outlet openings 116, with each outlet opening 116 being aligned with an inlet opening (not visible) provided in an adjacent wall of a respective one of the tine stripper bands 102. The stripper bands 102 are each held in tight engagement with the bottom wall 114 of the steam manifold 112 by a bolt and nut arrangement 118, the bolt of which passes through a pinched together rear end portion 120 of each stripper band 102 and through one side of an angle bracket 122 having its other side fixed to a vertical rear wall 124 of the manifold 112.

Steam is delivered to the manifold 112 by the steam distribution tube 48 which is coupled to an opening (not shown) provided in the rear wall 120 of the manifold 112, and exits the manifold 112 by way of the outlet openings 116 which are respectively aligned with the inlet openings (not shown) provided one each in each of the stripper bands 102. Steam exits each of the stripper bands 102 at an outlet 126 located just forward of the rear mounting portion 104 of the upper section of the stripper.

Thus, it will be understood that each of the pick-up tine stripper bands 102 serves also as a steam injector tube for placing steam into the underside of a windrow of crop being elevated by the pick-up 100. Further, if one of the tine stripper bands 102 becomes damaged, it may be easily replaced by removing the associated nut and bolt assembly 122 and loosening the fasteners 108 and 110. The stripper band 102 is then slid forwardly so that the head of the fastener 110 is aligned with the large section of the keyhole-shaped opening provided in the stripper band mounting portion 104. The slot in the rear end of the rear mounting portion 104 is then free of the fastener 108 permitting the stripper band 102 to be lifted off the fastener 108. At this point, the stripper band 102 may be moved forwardly away from the pick-up 100. A reverse procedure is used for installing the replacement stripper band 102.

Having described the preferred embodiment, it will become apparent that various modifications can be made without departing from the scope of the invention as defined in the accompanying claims.

The invention claimed is:

1. In a combination of a crop pick-up assembly and a steam injection manifold assembly for treating a windrow of crop elevated by said pick-up with steam, with the pick-up assembly including a tined reel and crop stripper bands located between co-planar sets of teeth spaced across a width of said tined reel, and with the injector manifold assembly including a steam manifold having a steam inlet and a plurality of outlet openings respectively associated with a plurality of injector tubes spaced across the width of said tined reel, the improvement comprising: a releasable coupling arrangement mounting each tube to said tubular manifold and said stripper bands are tubular and define said steam injector tubes.

2. The combination, as defined in claim 1, wherein said steam manifold is mounted to a lower rear location of said pick-up assembly; and at least one of said steam injector tubes extending forwardly at a lower side of said tined reel and having steam discharge ends located slightly forward of said reel.

3. The combination, as defined in claim 1, wherein said manifold has a first planar side extending lengthwise of said manifold; said steam outlet openings being located in said planar surface; and said stripper bands each having a second planar side abutting said first planar side and containing a steam inlet opening aligned with an associated one of said steam outlet openings.

* * * * *